United States Patent [19]
Gregory

[11] 3,710,761
[45] Jan. 16, 1973

[54] ANIMAL SHIPPING CRATE
[75] Inventor: Frederick S. Gregory, Dallas, Tex.
[73] Assignee: Aeropet, Inc., Dallas, Tex.
[22] Filed: Aug. 25, 1971
[21] Appl. No.: 174,606

[52] U.S. Cl. .................... 119/19, 220/4 E, 220/31 S
[51] Int. Cl. ........................................... A01k 01/02
[58] Field of Search ....... 119/19, 17, 18, 15; 220/4 E, 220/4 B, 80, 31 S

[56] References Cited
UNITED STATES PATENTS

| | | | |
|---|---|---|---|
| 3,261,493 | 7/1966 | Smith | 220/80 X |
| 3,407,961 | 10/1968 | Box | 220/4 E X |
| 3,490,417 | 1/1970 | Swinney | 119/19 |

*Primary Examiner*—Hugh R. Chamblee
*Attorney*—William T. Wofford et al.

[57] ABSTRACT

The specification discloses an animal shipping crate, especially useful for airlines, and which comprises two identical half sections, each of which is formed from a unitary piece of plastic. Each half section has side walls which slope outward from a closed end toward an open end and which may be nested within each other for storage purposes and assembled by coupling together the open ends to form a crate. Formed in the closed end of each section, on the inside thereof, is a water trough and extending through the wall structure of each section is a water passageway. The trough and passage-way of each section are located whereby the trough of one section is below the passageway of the other section regardless upon which end the assembled crate is resting. Each section also has outwardly extending flanges formed on opposite sides adjacent their open ends whereby the two sections may be locked together by elongated C-shaped clamps adapted to fit around adjacent flanges of two sections when joined together. Each flange has a notch formed therein along its associated side to facilitate bending of the flange. The C-shaped clamps are adapted to fit around adjacent flanges outward of each notch. Either pair of flanges coupled together with a C-shaped clamp serves as a hinge to allow the sections to be opened or closed when the other pair of flanges are not coupled together.

13 Claims, 5 Drawing Figures

PATENTED JAN 16 1973
3,710,761
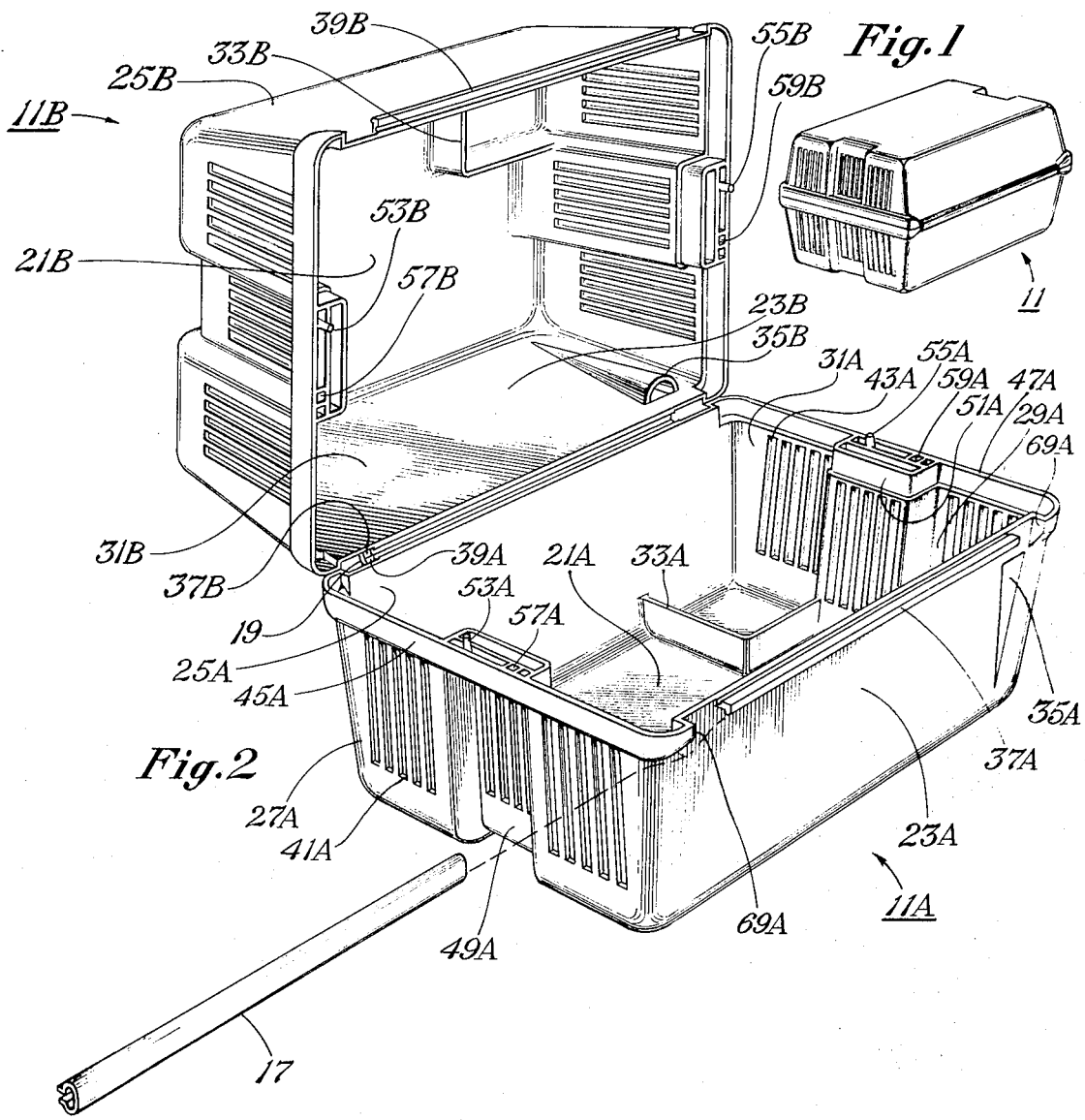
Fig.1
Fig.2
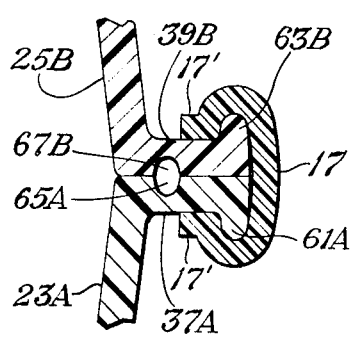
Fig.3
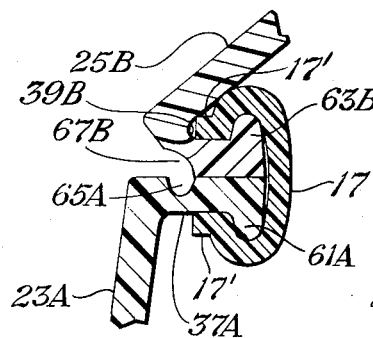
Fig.4
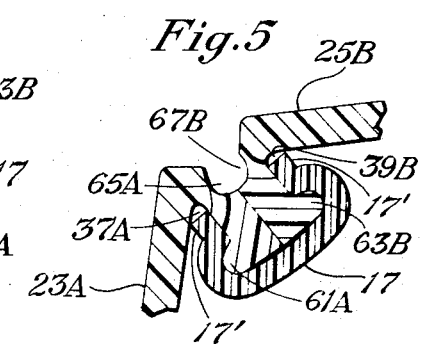
Fig.5
INVENTOR
Fredrick L. Gregory
BY
Wofford, Felsman & Fults
ATTORNEYS

1

ANIMAL SHIPPING CRATE

BACKGROUND OF THE INVENTION

This application relates to an animal shipping crate which may be stored in a minimum of space while disassembled and which may be readily assembled to form a crate for shipping animals and which is especially useful for airline purposes.

In the current practice of shipping animals via airlines, animal shipping crates or containers are stored at the ticket counter and sold to customers or passengers desiring to ship their animals. They are usually stored in a disassembled condition and assembled at the ticket counter when sold. Storage space at the airline ticket counters is at a premium as well as time in assembling and loading the crates with the animals. After the animals have been loaded into the crates, they are stored or shipped on the planes with the passengers' luggage.

Heretofore, containers or crates used to ship animals on airlines have had disadvantages in that they are relatively expensive, they take up a lot of storage space when they are not in use, and they are relatively difficult to assemble. Moreover, they have sharp edges or sharp metal projections extending from the metal doors which can readily tear or cut other passengers' luggage with which the animal containers are shipped.

SUMMARY OF THE INVENTION

In accordance with the present invention, there is provided an animal shipping crate which has advantages in that it is inexpensive, it may be stored in a disassembled condition in a minimum of space, and may be readily assembled to form a complete shipping crate. Moreover, it has no sharp edges or projections which would otherwise tear or cut the accompanying luggage of other passengers.

The crate comprises two sections adapted to be coupled together, each section having a closed end, an open end, and four sides. The closed end of one section is adapted to fit into the open end of the other section whereby the two sections are nestable within each other for storage purposes. The open ends of the sections are adapted to be located adjacent to each other to form a crate. The crate has at least two pairs of sides that fit together when the open ends are located adjacent to each other. Removable coupling means is provided for each pair of sides for coupling together the sides to secure or lock the two sections together. The sides of either pair are adapted to be pivoted with respect to each other when coupled together with a coupling means to allow the sections to be opened or closed when the sides of the other pair are not coupled together.

In a further aspect, each section has a water trough formed inside on the bottom of its closed end and on one side thereof. In addition, each section has a fluid-flow passageway on the side opposite its trough and leading from the outside to the inside whereby the trough of one section is below a passageway of the other section of an assembled crate when resting on either end.

In the embodiment disclosed, at least two opposite sides of each section have outwardly extending flanges adjacent their open ends. The flanges of one section match with the opposite flanges of the other section to form two pairs of adjacent flanges when the open ends are located adjacent each other. Each flange has a notch formed therein along its associated section side to facilitate bending of the flange. Each coupling means comprises a member, C-shaped in cross-section and adapted to fit around adjacent flanges outside of each notch. Either pair of flanges with its coupling means serves as a hinge to allow the sections to be opened and closed when the other pair of flanges are not coupled together.

Thus, the crate is assembled from four parts; two half sections and two C-shaped clamps. Each half section is substantially identical and is formed from a unitary piece of plastic thereby forming an inexpensive crate and which may be readily assembled by a person with a minimum of instruction and without the need of assembly tools.

BRIEF DESCRIPTION OF THE DRAWINGS

FIG. 1 illustrates the animal shipping crate in an assembled and closed condition;

FIG. 2 illustrates the animal shipping crate in an open condition prior to insertion of an animal therein; and FIGS. 3–5 illustrate a clamp and flange arrangement which serves to lock the two sections together and acts as a hinge to allow the two sections to be pivoted with respect to each other.

DETAILED DESCRIPTION OF THE INVENTION

Referring to FIGS. 1 and 2, the animal shipping crate is identified by numeral 11 and is formed from two identical half sections 11A and 11B and two elongated C-shaped clamping members 17 and 19. As will be described subsequently, the clamps 17 and 19 are removable whereby the sections may be stored in a disassembled condition by nesting the sections within each other.

Each half section is a unitary piece of plastic formed by an injection molding process and preferably employing linear polyethylene. Since each half section is identical, the same mold can be employed to form both half sections, thus minimizing the cost. Clamping members 17 and 19 are also formed of polyvinyl chloride by an extrusion process.

In the Figures and in the following description, the "A" after the reference characters identifies the components or parts of section 11A. It is to be understood that section 11B will have the same parts as section 11A although they will be identified with a "B" following the corresponding reference characters. Since the half sections are identical, reference now will be made primarily to section 11A for a detailed description thereof. It comprises a closed end 21A; two opposite sides 23A and 25A; two opposite sides 27A and 29A; and an open end identified at 31A. The four sides slope away from the end 21A towards the open end, the amount of slope in one embodiment being about 7° from the vertical. Section 11A also includes a water trough 33A formed on one side of end 21A and also a water passageway 35A formed through side 23A. Extending outward from sides 23A and 25A and adjacent the open end of section 11A are two identical flanges, 37A and 39A, and which are employed for clamping and hinge purposes as will be described subsequently.

Formed through sides 27A and 29A are elongated air openings 41A and 43A. Also extending outwardly from sides 27A and 29A and adjacent the open end of section 11A are two flanges 45A and 47A. Extending inwardly of sides 27A and 29A are two recessed portions 49A and 51A whereby portions of the flanges 45A and 47A adjacent the recessed portions serve as handles. Male projections 53A and 55A extend from flanges 45A and 47A respectively. In addition, female indentations 57A and 59A are formed in flanges 45A and 47A.

In a disassembled state, the two sections, 11A and 11B may be nested within each other by inserting the closed end of one section into the open end of the other section. This is done to minimize storage space. In one embodiment, the water troughs 33A and 33B extend only about 1½ inches above the closed end of each section. Thus, when stacking nested sections, the package height is increased only 1½ inch per added section.

Since section 11A and 11B are identical, either section may serve as the top or bottom. Thus, the airline clerk may take any two sections to form a crate. In the alternative, one section may be colored, for example, blue while the other section may be white and the sections stacked alternately blue and white whereby the clerk may easily identify and obtain the sections which are to form the top and bottom of the crate. When the sections are stored in a nested condition, the two clamps 17 and 19 are located within the bottom of each alternate section to one side of the water trough.

Since the sections have sloping sides, sticking or jamming of the section halves does not occur so that each section may be removed from a carton with absolute ease.

Referring to FIGS. 3-5, it can be seen that flange 37A has a projecting edge 61A whereby it is L-shaped in cross-section. It also has a notch 65A formed in the top side and which extends along and adjacent the section side 23A. It is to be understood that each of the flanges 39A, 37B, and 39B are identical with flange 37A.

In assembly, the open end 31B of section 11B is joined with the open end 31A of section 11A. The two sections are joined so that male projections 53A and 55A mate with female indentations 57B and 59B respectively. Similarly, the male projections 53B and 55B mate with female indentation 57A and 59A respectively. The purpose of these male and female interlocking members are to prevent lateral movement of the two sections after they have been joined and locked together.

When the open ends of the two sections are located together, the flanges 37A and 39B of sides 23A and 23B respectively are located adjacent each other to form a T-shaped configuration in cross-section as illustrated in FIG. 3. Flanges 39A and 37B of sides 25A and 23B respectively also form a similar configuration. In this position, either clamp 17 or 19 may be inserted in place to form a hinge for opening the two sections. In FIGS. 3-5, clamp 17 is illustrated as being employed for this purpose. In this respect, the clamp 17 is fitted around the projecting edges 61A and 63B of the adjacent flanges 37A and 39B respectively. This is done by inserting the end of the clamp 17 around the ends of the adjacent flanges and sliding the clamp 17 forward to encompass the entire length of both flanges 37A and 39B. As illustrated in FIG. 2, located on opposite ends of flange 37A and spaced therefrom, are a pair of extending shoulders or stops 69A. A similar pair of shoulders or stop 71A (not shown) extend on both sides of flange 39A. These shoulders serve to prevent the C-shaped clamping members from slipping off the adjacent flanges to which they are clamped. They also aid to prevent lateral movement of the two sections when clamped together with the two clamps. Clamps 17 and 19 are flexible whereby they may be bent around the shoulders or stops when inserting the clamps around the adjacent flanges. The forward end of a clamp is slid around adjacent flanges until it hits the stop at the other end. The trailing end then is snapped behind its end stop.

As indicated above, with only one of the C-shaped clamps in place, the clamp along with the adjacent flanges acts as a hinge, whereby the two sections may be opened to allow an animal to be inserted into the lower section. In this respect, and referring to FIG. 3, the notches 65A and 67B allow the flanges 37A and 39B to bend relative to their associated sides 23A and 25B. When the clamp 17 is in place, its extending edges or lips 17' are located outward of the two notches. Thus, with only clamp 17 in place (clamp 19 not having been inserted in place) the side 25B and hence section 11B may be pivoted or rotated to the right (as illustrated in FIGS. 3-5) until it abuts against the top portion of the clamp 17. The amount of movement of side 25B from the position shown in FIG. 3 to the position shown in FIG. 4 is about 45°. After the side 25B abuts against the top edge of the clamp 17, the side 25B and hence section 11B may be pivoted or rotated to the right further as flange 37A begins to bend at the point below its notch 65A. It will bend until the lower edge of clamp 17 abuts against the side 23A of the section 11A. The amount of movement from the position shown in FIG. 4 to the position shown in FIG. 5 also is about 45° whereby one section may be opened about 90° from its closed position to allow an animal to be inserted into the other section.

After the animal is inserted, the two sections are closed and the other clamp inserted in place to securely lock the two sections together to prevent the animal from escaping.

As now can be understood the crate is formed of only four pieces — two half sections and two C-shaped clamps. Since each section is identical, they may readily be joined together by insuring only that the male projections and the female indentations formed in the handles mate with each other. Having joined the two open ends of the two sections together, either C-shaped clamp may be inserted in place to form a hinge whereby the two sections then may be opened to allow the animal to be inserted in place. This simplified assembly requires little if any mechanical ability and can be done in a minimum of time.

Since the crate opens like a chest, there is no doors required which have disadvantages in that animals, particularly cats, are difficult to insert into a crate or container through a small door. The customer may insert the animal or the opened crate may be placed on the floor for the animal to walk in or enter with a short leap. After the animal has been inserted, the clerk merely has to close the two sections and insert and snap the other clamp in place. Since the sides of the crate project outward toward the center, luggage cannot block off the air openings required for the animals. Moreover, since the crate is formed completely of plastic there are no sharp edges or projections which would otherwise tear or cut the accompanying luggage of other passengers. In addition, since both sections are identical in structure, either end 11A or 11B can serve as the bottom. Either end 21A or 21B will have a water trough with an associated fluid flow passageway above the trough and the trough to be used may be filled without opening the crate. Moreover, assembly of the crate can be done entirely by hand without the use of tools. Since the handles do not project outward, flat surfaces are presented on all sides which facilitates stacking when assembled, and nesting when un-assembled. The recessed handle features also provides additional useable space on the inside of the crate.

In one embodiment the crate and its component sections have the following dimensions. Since each section is identical, reference will be had primarily to section 11A. The dimensions of the closed or bottom end 21A are about 16 × 24 inches, while the dimensions of the open or top end 31A are about 18 × 26 inches. The height of the side walls of section 11A is about 9 inches whereby the overall height of a crate is about 18 inches and its maximum dimensions at its center is about 18 × 26 inches. The thickness of the wall structure forming the crate is about 0.125 of an inch. The flange 37A below the notch 65A has a thickness of about 0.050 of an inch. The thickness of the other flanges 39A, 37B, and 39B at the point of their notches is the same dimensions. The air openings 41A and 43A have dimensions of about ⅝ inch × 6 inches. The weight of the crate having the above dimensions is about 10.7 pounds.

I claim:
1. An animal shipping crate adapted to be assembled, comprising:
   two sections adapted to be coupled together to form a crate,
   each section having a closed end, an open end, and four sides,
   the closed end of one section being adapted to fit into the open end of the other section whereby said two sections are nestable within each other for storage purposes,
   the open ends of said sections being adapted to be located adjacent to each other to form a crate,
   said crate having at least two pairs of sides which fit together when said open ends are located adjacent to each other,
   removable coupling means for coupling together said sides of each pair to secure said two sections together,
   the sides of each pair being adapted to be pivoted with respect to each other when coupled together with its coupling means to allow said sections to be pivoted apart and together when the sides of the other pair are not coupled together with its coupling means.
2. The crate of claim 1 wherein:
   each section has a water trough formed inside on the bottom of its closed end and on one side thereof, and
   each section has a fluid flow passageway on a side opposite its trough and leading from the outside to the inside whereby the trough of one section is below a passageway of the other section of an assembled crate when resting on either of said closed ends.
3. The crate of claim 2 wherein each section is formed of a unitary piece of plastic material.
4. The crate of claim 1 wherein:
   at least two opposite sides of each section have outwardly extending flanges adjacent their open ends,
   the flanges of one section matching with the opposite flanges of the other section to form two pairs of adjacent flanges when said open ends are located adjacent to each other,
   said coupling means for each pair being adapted to couple together adjacent flanges of each pair to secure adjacent flanges and hence said two sections together,
   each flange having a flexible portion whereby either pair of flanges with its coupling means will serve as a hinge to allow said sections to be pivoted apart and together when the other pair of flanges are not coupled together with its coupling means.
5. The crate of claim 4 wherein:
   each section including its flanges is formed of plastic material,
   each flange has a notch formed therein along its associated section side to facilitate bending of the flange,
   each coupling means comprising a member C-shaped in cross-section and adapted to fit around adjacent flanges outward of each notch.
6. The crate of claim 5 wherein:
   each flange is elongated and extends along its associated section side,
   each flange has a projecting edge whereby each flange is L-shaped in cross-section, adjacent flanges having a T-shaped configuration in cross-section,
   each flanged side of a section having an outwardly extending shoulder on each end of its flange and spaced therefrom forming a pair of shoulder with its flange therebetween,
   each C-shaped member having a length greater than the length of said flanges but less than the distance between a pair of shoulders,
   each C-shaped member being flexible for insertion in place around adjacent flanges and between the pairs of shoulders spaced from adjacent flanges.
7. The crate of claim 6 wherein:
   each section has four sides sloping away from its closed end towards its open end,
   each section has air openings formed in at least two opposite sides,
   the sides in which the openings are formed having outwardly extending flanges adjacent the open ends and recessed portions extending inward adjacent the flanges to form handles.
8. The crate of claim 7 wherein:
   the sides of each section in which said handles are formed have male and female projections and indentations formed in their flanges whereby the male and female projections and indentations of one section are adapted to mate with female and male indentations and projections of the other section when coupled together to form a crate to prevent lateral movement of said two sections.

9. The crate of claim 7 wherein said sections each are formed of a unitary piece of plastic material and are substantially identical.

10. The crate of claim 9 wherein:
   each section has a water trough formed inside on the bottom of its closed end and on one side thereof, and
   each section has a fluid flow passageway on a side opposite its trough and leading from the outside to the inside whereby the trough of one section is below a passageway of the other section of an assembled crate when resting on either of said closed ends.

11. A section formed of a unitary piece of plastic to be coupled to a substantially identical section for forming an animal shipping crate, comprising:
   a closed end and four sides sloping away from said closed end forming an open end,
   the closed end of said section being adapted to fit into the open end of a substantially identical section whereby the two sections are nestable within each other for storage purposes,
   the open end of said section being adapted to be located adjacent to the open end of a substantially identical section to form a crate,
   said section having a water trough formed inside of the bottom of its closed end and on one side thereof,
   a fluid flow passageway on a side opposite said trough and leading from the outside to the inside,
   two opposite sides of said section having outwardly extending flanges adjacent the open end thereof and adapted to be coupled with coupling means to similar flanges of a substantially identical section to secure the two sections together,
   said flanges on opposite sides having notches formed therein along said opposite sides to facilitate bending of the flanges whereby either flange may be coupled to a similar flange of a substantially identical section with coupling means to act as a hinge when the other flange is not coupled to a similar flange of a substantially identical section,
   the two other opposite sides of said section having outwardly extending flanges and recessed portions extending inward adjacent the flanges thereof to form handles.

12. The section of claim 8 wherein air openings are formed in at least two opposite sides thereof.

13. An animal shipping crate adapted to be formed from four unitary pieces of plastic material, comprising:
   two identical half sections and two identical elongated C-shaped clamping members,
   each half section having a closed end and four sides sloping away from said closed end for forming an open end,
   the closed end of a section being adapted to fit into the open end of the other section whereby the two sections are nestable within each other for storage purposes,
   the open end of a section being adapted to be located adjacent to the open end of the other section to form a crate,
   each section having a water trough formed inside of the bottom of its closed end on one side thereof,
   a fluid flow passageway on a side opposite the trough and leading from the outside to the inside,
   two opposite sides of a section having outwardly extending flanges adjacent the open end thereof and adapted to be coupled with coupling means to similar flanges of the other section to secure the two sections together,
   said flanges on opposite sides of a section having notches formed therein along said opposite sides to facilitate bending of the flanges whereby either flange may be coupled to a similar flange of the other section with coupling means to act as a hinge when the other flange is not coupled to a similar flange of the other section,
   the two other sides of a section having outwardly extending flanges and recessed portions extending inward adjacent to flanges thereof to form handles,
   each section having air openings formed in at least two opposite sides thereof.

* * * * *